United States Patent
Hao et al.

(10) Patent No.: US 12,494,054 B2
(45) Date of Patent: Dec. 9, 2025

(54) NON-INTERFEROMETRIC, NON-ITERATIVE COMPLEX AMPLITUDE READING METHOD AND APPARATUS

(71) Applicant: Fujian Normal University, Fuzhou (CN)

(72) Inventors: Jianying Hao, Fuzhou (CN); Xiaodi Tan, Fuzhou (CN); Xiao Lin, Fuzhou (CN); Yuhong Ren, Fuzhou (CN)

(73) Assignee: Fujian Normal University, Fuzhou (CN)

( * ) Notice: Subject to any disclaimer, the term of this patent is extended or adjusted under 35 U.S.C. 154(b) by 260 days.

(21) Appl. No.: 18/213,880

(22) Filed: Jun. 25, 2023

(65) Prior Publication Data

US 2024/0104918 A1  Mar. 28, 2024

(51) Int. Cl.
*G06V 10/88* (2022.01)
*G06V 10/774* (2022.01)
*G06V 10/82* (2022.01)
*G06V 10/143* (2022.01)
*H04N 1/407* (2006.01)

(52) U.S. Cl.
CPC .......... *G06V 10/895* (2022.01); *G06V 10/774* (2022.01); *G06V 10/82* (2022.01); *G06V 10/143* (2022.01); *G06V 10/88* (2022.01); *H04N 1/4072* (2013.01)

(58) Field of Classification Search
None
See application file for complete search history.

(56) References Cited

U.S. PATENT DOCUMENTS

| | | | | |
|---|---|---|---|---|
| 9,459,155 B2 * | 10/2016 | Okamoto | .......... | H04B 10/2507 |
| 2007/0052694 A1 * | 3/2007 | Holmes | .................. | G02B 27/46 |
| | | | | 345/204 |
| 2011/0292402 A1 * | 12/2011 | Awatsuji | .............. | G03H 1/0443 |
| | | | | 356/495 |
| 2019/0294108 A1 * | 9/2019 | Ozcan | .................... | G06V 10/82 |
| 2020/0410706 A1 * | 12/2020 | D'Angelo | ............... | G06T 7/557 |

* cited by examiner

*Primary Examiner* — Haris Sabah
(74) *Attorney, Agent, or Firm* — LANWAY IPR SERVICES; Chun-Ming Shih

(57) ABSTRACT

The present invention discloses a non-interferometric, non-iterative complex amplitude reading method and apparatus. The reading method includes the following steps: diffracting a light beam containing amplitude information and phase information to obtain a diffraction pattern with intensity variations; constructing a diffraction intensity-complex amplitude model and training it based on the correlation between the diffraction pattern and amplitude information and phase information, and applying the trained model directly to new diffraction images to obtain amplitude information and phase information. The method can achieve detection of complex amplitude information, including amplitude and phase, from a single diffraction image, improve the stability and accuracy of phase reading results, increase the calculation speed, and simplify the optical system. It is suitable for applications in holographic storage, biomedical image processing, and microscopic imaging, among others.

17 Claims, 11 Drawing Sheets

NON-INTERFEROMETRIC, NON-ITERATIVE COMPLEX AMPLITUDE READING METHOD AND APPARATUS

FIELD OF THE DISCLOSURE

The present invention relates to the field of imaging technology, and more particularly to a non-interferometric, non-iterative complex amplitude reading method and apparatus.

BACKGROUND OF THE INVENTION

Phase and amplitude are two fundamental characteristics of light. In fields such as information storage, biomedical research, and computational imaging, it is often necessary to simultaneously obtain both the amplitude and phase information of light.

Current detectors can only detect the intensity of light, while obtaining phase information requires indirect calculation through interference or non-interference iterative methods.

Interference methods require introducing a reference beam to convert phase information into interference patterns, which are then used to calculate the phase. The method results in a complex optical system, unstable phase reading results, and relatively low accuracy.

Although non-interference methods do not require the introduction of a reference beam and are relatively simple, they often require multiple iterations or multiple shooting operations to obtain relatively accurate phase information. Therefore, the drawback of non-interference iterative methods is slow calculation speed.

In certain specialized fields such as real-time image processing for information storage and reading, and computational imaging, there is a requirement for both speed and precision in information reading, where accurate and rapid reading of both amplitude and phase information is needed within a simple optical system. It is evident that current technology's aforementioned interference and non-interference methods fail to meet these requirements.

SUMMARY OF THE INVENTION

This invention proposes a non-interferometric, non-iterative complex amplitude reading method and apparatus, based on a single diffraction pattern to extract complex amplitude information from intensity images. The aim is to overcome the drawbacks of the existing techniques for obtaining phase information, such as complex optical systems, unstable phase reading results, low accuracy, and slow computation speed in interferometric and non-interferometric methods. This invention can improve the stability and accuracy of phase reading results, increase computation speed, simplify the optical system, and is applicable to fields such as holographic storage, biomedical image processing, and microscopy imaging.

Firstly, the invention provides a non-interferometric, non-iterative complex amplitude reading method, including the following steps:

Step S01: Diffracting a light beam containing amplitude information and phase information to obtain a diffraction pattern with intensity variations;

Step S02: Constructing a diffraction intensity-complex amplitude model by training the relationship between the diffraction pattern, amplitude information, and phase information, and directly obtaining the amplitude and phase information for new diffraction patterns using the diffraction intensity-complex amplitude model.

Preferably, in step S02, a neural network model is established for the diffraction intensity-complex amplitude model by training multiple input and output relationships.

Preferably, step S01 includes the following steps:

Step S11: Experiment image generation: Generating n amplitude images and phase images with different patterns, where n≥1 and n is a positive integer;

Step S12: Experiment image capture: Using a complex amplitude image datasetontaining the amplitude images and phase images to modulate the light beam in amplitude and phase, and capturing the corresponding diffraction intensity images I.

In step S02, the following steps are included:

Step S21: Dataset preparation: Combining the diffraction intensity images with the complex amplitude image dataset to form dataset, dividing the dataset into mutually exclusive neural network training dataset and validation dataset, which are used for training and validation of the neural network model CNN;

Step S22: Model construction: Establishing a diffraction intensity-complex amplitude model consistent with the neural network model CNN.

Preferably, after step S22, the following step is included:

Step S221: Model optimization: Setting the loss function of the neural network model CNN, training the parameters of the neural network model CNN using the neural network training dataset until the loss function converges.

Preferably, after step S221, the following step is included:

Step S222: Model validation: Validating the generalization performance of the neural network model CNN using the validation dataset, obtaining a generalized neural network model CNN.

Preferably, in step S02, after step S22, when obtaining the amplitude and phase information, the following step is included:

Step S23: Model application: Inputting a new diffraction intensity image into the trained and validated neural network model CNN, outputting the amplitude image and phase image.

Preferably, in step S11, the amplitude images and phase images are random encoding amplitude images a and phase images b, or the amplitude images and phase images are natural visual images.

Preferably, in step S22, the neural network model CNN adopts an unsupervised neural network model structure combined with a physical optics diffraction model, or the neural network model CNN adopts a data-driven end-to-end neural network model structure, or the neural network model CNN includes intensity-amplitude neural network model CNN1 and intensity-phase neural network model CNN2, separately used for reconstructing the amplitude images and phase images of the complex amplitude images, or the neural network model CNN is set as a single-input diffraction intensity image, dual-output amplitude images and phase images intensity-amplitude-phase neural network model CNN_12.

Secondly, the invention provides a non-interferometric, non-iterative complex amplitude reading apparatus for implementing any of the non-interferometric, non-iterative complex amplitude reading methods described in the first aspect of the invention. The reading apparatus includes an optical system and electronic devices. The optical system comprises, sequentially arranged along the propagation direction of the incident light beam, a laser, a beam collimation component, a first ½-wave plate, an aperture, a first imaging component, a first polarizer, and a transmissive-reflective first beam splitter; a transmissive light beam propagation direction of the first beam splitter is equipped with an amplitude spatial light modulator, while a reflective light beam propagation direction of the first beam splitter sequentially comprises a second polarizer, a second imaging component, a second ½-wave plate, and a transmissive-reflective second beam splitter; a transmissive light beam propagation direction of the second beam splitter is equipped with a phase spatial light modulator, while a reflective light beam propagation direction of the second beam splitter sequentially comprises a third imaging component and a photoelectric detector; the electronic devices include one or more processors and memory devices, with the memory devices storing one or more computer programs that, when executed by the one or more processors receiving the diffraction patterns captured by the photoelectric detector, implement the steps of any of the non-interferometric, non-iterative complex amplitude reading methods described in the first aspect of the invention.

Preferably, the beam collimation component includes a pinhole filter and collimating lens sequentially arranged along the propagation direction of the incident light beam.

This invention provides a non-interferometric, non-iterative complex amplitude reading method that can be implemented by the non-interferometric, non-iterative complex amplitude experiment provided by the invention.

The non-interferometric, non-iterative complex amplitude reading method and apparatus of the present invention can achieve at least the following beneficial effects:

1. The non-interferometric, non-iterative complex amplitude reading method of the present invention can detect complex amplitude information, including amplitude and phase, from a single diffraction image based on intensity images. This overcomes the drawbacks of existing technologies, such as complex optical systems in interferometry for obtaining phase information, unstable phase reading results, lower accuracy, and slower computation speeds in non-interferometric iterative methods. As a non-interferometric method, it does not require an interference reference beam for phase reading and directly reconstructs the amplitude and phase through the model without iteration. It only requires capturing a single diffraction image, simplifying the complex amplitude information reading operation. The method enables simultaneous amplitude and phase reading, real-time reading of multi-level amplitude and multi-level phase, and improves the stability and accuracy of phase reading results. It also achieves direct complex amplitude reading without iterative computation, speeding up calculations and simplifying the optical system, making it suitable for applications in holographic storage, biomedical imaging, and microscopic imaging.

2. The non-interferometric, non-iterative complex amplitude reading method of the present invention can adopt existing neural network models or construct different neural network model structures. After training and validation, intensity images containing diffraction information are used as input, accurately and directly predicting the corresponding amplitude and phase information. This improves the reading accuracy and efficiency of complex amplitude information, including amplitude and phase, meeting the modern and intelligent needs of optical applications.

3. The non-interferometric, non-iterative complex amplitude reading apparatus of the present invention is a non-interferometric reading system, requiring only that the light beam propagates a preset distance in the air, and does not need reference beams, additional lenses, or other optical systems during reading. The device has a reasonably compact structure, fast amplitude and phase reading speeds, and accurate, stable, and reliable reading results.

The foregoing, as well as additional objects, features and advantages of the invention will be more readily apparent from the following detailed description, which proceeds with reference to the accompanying drawings.

BRIEF DESCRIPTION OF THE DRAWINGS

The objects, spirits, and advantages of the preferred embodiments of the present disclosure will be readily understood by the accompanying drawings and detailed descriptions, wherein.

Figure 1:
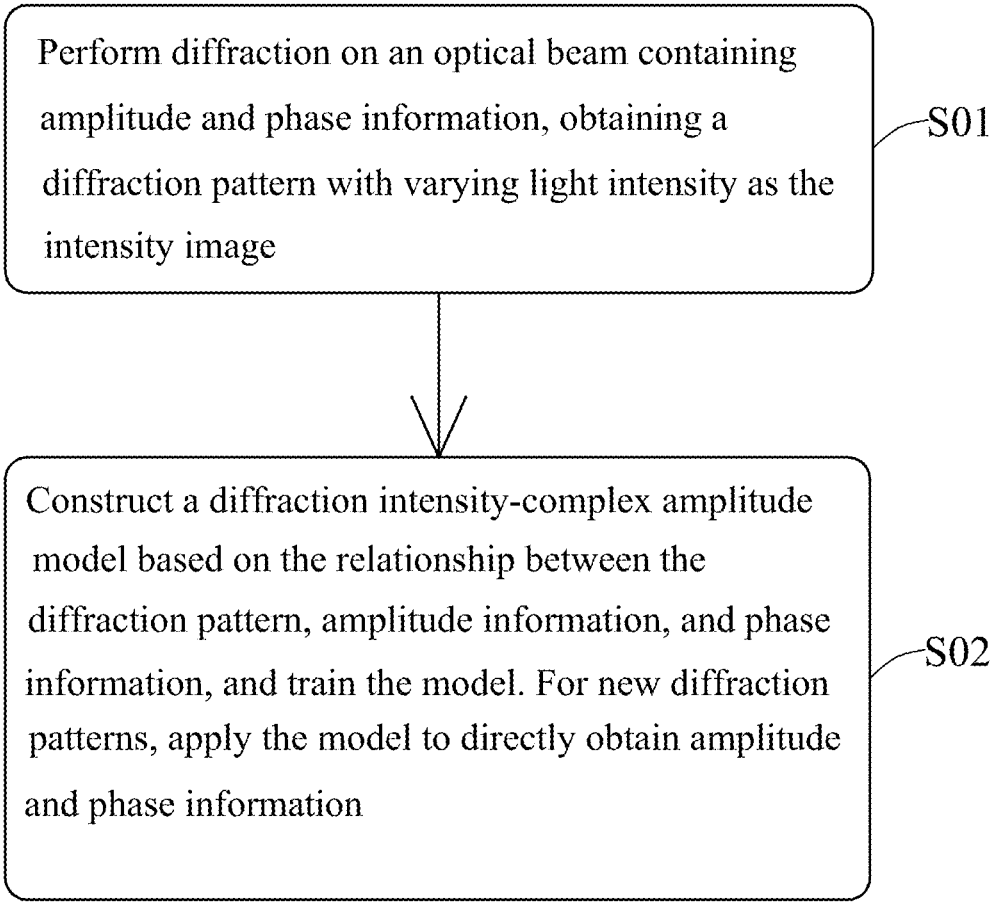
FIG. 1 is a flowchart of a non-interferometric, non-iterative complex amplitude reading method in an embodiment of the present invention, implementing rapid complex amplitude reading through a single diffraction intensity image.

In the drawing, 1 is a laser, 2 is a pinhole filter, 3 is a collimating lens, 4 is the first ½ waveplate, 5 is an aperture, 6 is the first relay lens, 7 is the second relay lens, 8 is the first polarizer, 9 is the first beam splitter, 10 is an amplitude spatial light modulator, 11 is the second polarizer, 12 is the third relay lens, 13 is the fourth relay lens, 14 is the second ½ waveplate, 15 is the second beam splitter, 16 is a phase spatial modulator, 17 is the fifth relay lens, 18 is the sixth relay lens, and 19 is a photoelectric detector.

DESCRIPTION OF THE PREFERRED EMBODIMENTS

In order to describe in detail the technical content, structural features, achieved objectives and effects of the instant application, the following detailed descriptions are given in conjunction with the drawings and specific embodiments. It should be understood that these embodiments are only used to illustrate the application and not to limit the scope of the instant application.

Embodiment 1

Referring to FIG. 1, the embodiment provides a non-interferometric, non-iterative complex amplitude reading method, which aims to achieve a rapid reading method for amplitude and phase information of complex amplitude reconstruction using a single diffraction intensity image. This method can include the following steps:

Step S01: Perform diffraction on an optical beam containing amplitude and phase information, obtaining a diffraction pattern with varying light intensity as the intensity image;

Step S02: Construct a diffraction intensity-complex amplitude model based on the relationship between the diffraction pattern, amplitude information, and phase information, and train the model. For new diffraction patterns, apply the model to directly obtain amplitude and phase information.

The non-interferometric, non-iterative complex amplitude reading method of the embodiment is based on the following relationship between the diffraction pattern of light and the amplitude and phase information: the light field contains both amplitude and phase information. For example, loading amplitude and phase information on an object surface generates a certain light field distribution or pattern, at this point $z=0$, where z is the propagation direction of the light field. When the light propagates forward a predetermined distance, such as at $z=2$ mm, a diffraction pattern of the light field is generated at this location, which is an intensity image determined by the amplitude and phase of the object surface. The distribution of this diffraction pattern is determined by the diffraction behavior of the light field in the air and is objectively a unique distribution. When calculating this diffraction distribution, many approximate diffraction formulas can be proposed to construct models, such as the angular spectrum propagation model, point spread function model, etc. These models can approximate the distribution of such diffraction patterns. By using neural networks to construct the diffraction intensity-complex amplitude model, the inverse relationship between the diffraction pattern and amplitude and phase information is expressed. The neural network model that can correctly describe the intensity-complex amplitude relationship is obtained through specific data training. For new diffraction intensity images, they can be directly input into the neural network model to obtain the corresponding amplitude and phase information.

In the embodiment, the angular spectrum propagation model, etc., describe the forward propagation process of light, while the neural network model describes the reverse propagation process, that is, the inverse process.

In the embodiment, specifically in step S01, the optical beam containing amplitude and phase information is propagated a predetermined distance d and then incident on the photodetector 19. Through the diffraction effect of light, the intensity image received by the photodetector 19 is a diffraction pattern with varying light intensity.

Figure 2:
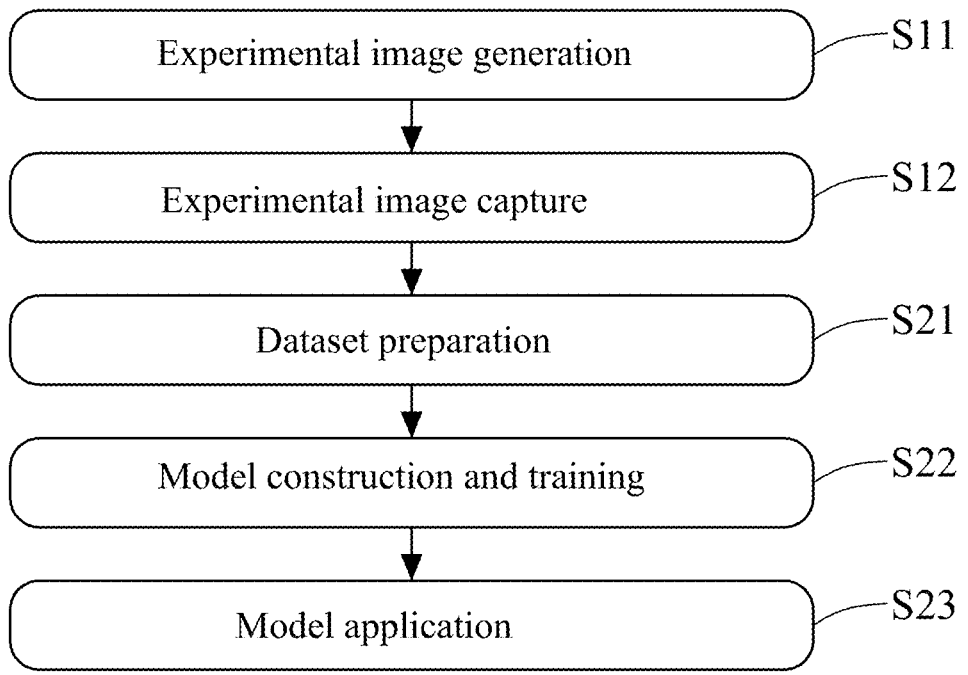
FIG. 2 is a flowchart of a non-interferometric, non-iterative complex amplitude reading method in another embodiment of the present invention, implementing rapid complex amplitude reading through a single diffraction intensity image.

Referring to FIG. 2, in the embodiment, specifically in step S02, the diffraction intensity-complex amplitude model is constructed as a neural network model.

The neural network model can be trained through multiple input and output correspondence relationships, establish the neural network model parameters of the diffraction intensity-complex amplitude model, and input a new diffraction pattern intensity image as input to accurately predict the corresponding amplitude and phase information.

It can be seen that by training the neural network model, it is possible to recover the complex amplitude information, including amplitude and phase information, from a single captured diffraction intensity image I. The captured diffraction intensity image is a non-interferometric image.

Referring to FIG. 2, the embodiment can further include the following steps in step S01:

Step S11: Experimental image generation: Generate n amplitude images and phase images with different patterns, where $n \geq 1$ and n is a positive integer. Generally, the larger the value of n, the more data is available, meaning a greater number of images with larger differences between them, resulting in better reading results.

Step S12: Experimental image capture: Use the complex amplitude image dataset, containing amplitude images and phase images, to modulate the amplitude and phase of the optical beam and capture the corresponding diffraction intensity images I.

In step S02, the following steps are included:

Step S21: Dataset preparation: Combine the diffraction intensity images and complex amplitude image dataset to form dataset Dm. Divide dataset into mutually exclusive neural network training dataset and validation dataset, according to a preset ratio, for training and validation of the neural network model CNN, respectively.

Step S22: Model construction: Establish a diffraction intensity-complex amplitude model consistent with the neural network model CNN. That is, establish a neural network model CNN to describe the diffraction intensity-complex amplitude relationship.

In the embodiment, in step S11, the amplitude images and phase images can be randomly encoded amplitude images (a) and phase images (b).

The randomly encoded amplitude images (a) and phase images (b) can be, for example, multi-level random encoded amplitude images (a) and phase images (b) within 16 levels, used for data storage.

Alternatively, in step S11, the amplitude images and phase images can be natural visual images.

The natural visual images are used for complex amplitude image reconstruction.

Figure 3:
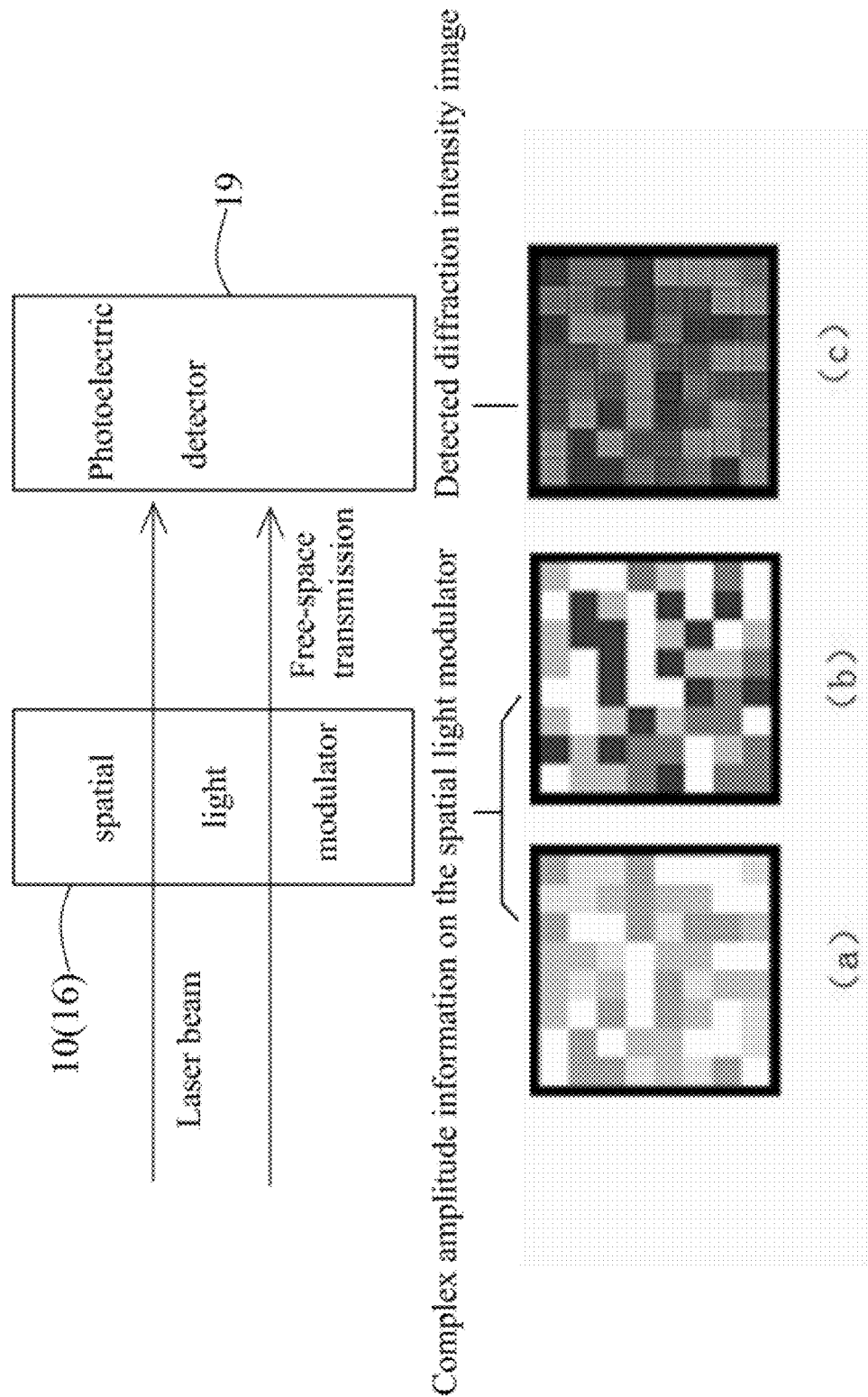
FIG. 3 is a schematic diagram of the complex amplitude reading principle in a non-interferometric, non-iterative complex amplitude reading method in an embodiment of the present invention.

Referring to FIG. 3, in step S12 of the embodiment, the complex amplitude image datasetontaining amplitude images and phase images is loaded onto a spatial light modulator to modulate the amplitude and phase of the laser beam, and the diffraction intensity image I is captured under corresponding amplitude and phase modulation using photodetector 19.

The laser beam can be a single-wavelength laser beam.

Specifically, two spatial light modulators can be used to upload amplitude images and phase images separately, modulating the amplitude and phase of the laser beam.

At this point, if the existing technology is used to directly detect the complex amplitude-modulated laser beam, only amplitude information can be detected, while phase information cannot be directly detected.

However, in the embodiment, the laser beam containing amplitude and phase information is propagated in free space for a predetermined distance d and then incident onto an image capturing device, such as photodetector 19. Due to the diffraction effect of light, the photodetector 19 receives the diffraction intensity image I with varying light intensity. The diffraction pattern of this image is related to the amplitude image information and phase image information of the laser beam. Then, by utilizing the relationship between the diffraction image and the amplitude image information and phase image information, a diffraction intensity-complex amplitude neural network model is established and trained. For new diffraction images, the hidden amplitude information and phase information can be directly obtained by inputting them into the trained neural network model.

Figure 4:
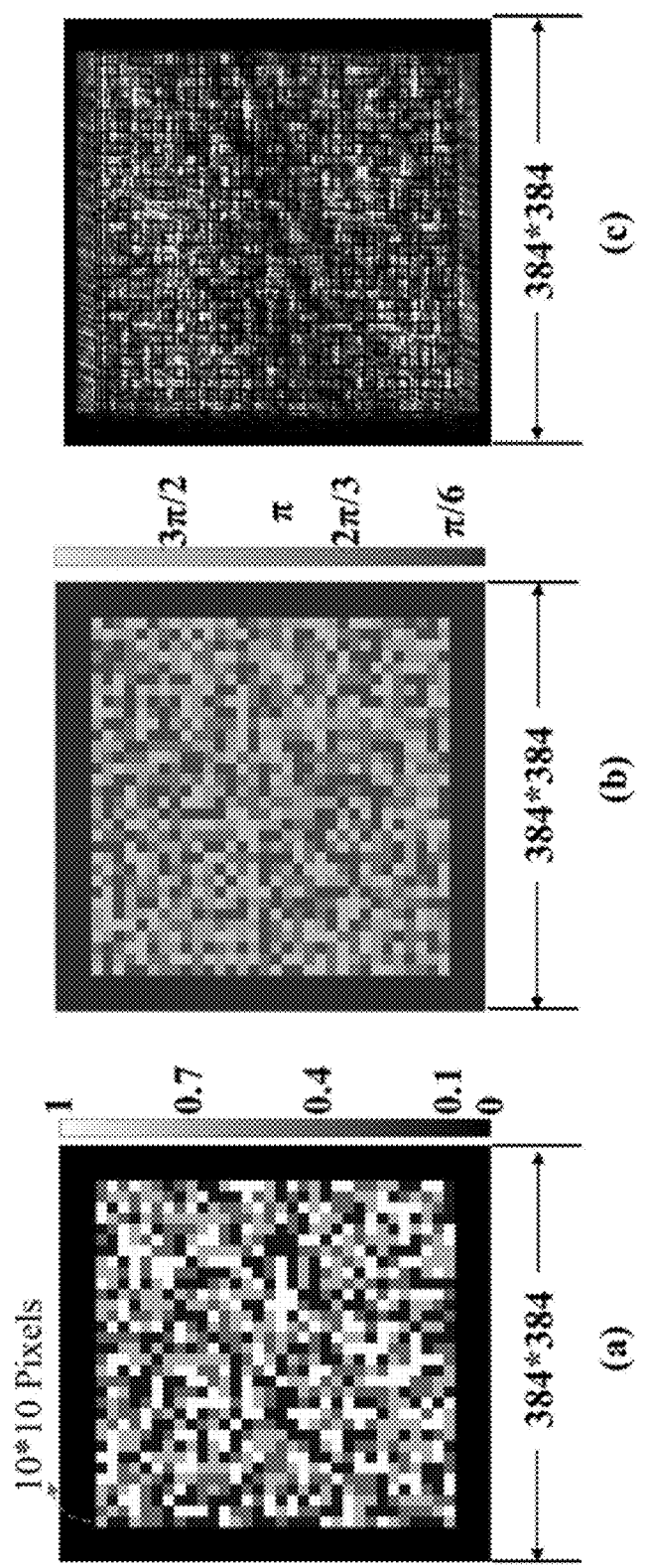
FIG. 4 is a schematic diagram of a non-interferometric, non-iterative complex amplitude reading method in an embodiment of the present invention, where both the phase image and amplitude image are four-level random encoded images, and the optical system output is a diffraction intensity image.

Referring to FIG. 4, the amplitude image (a) and phase image (b) are combined to form a complex amplitude distribution, which is transmitted along the optical axis or diffracted in the air for a preset distance, resulting in the diffraction intensity image (c).

The embodiment can further include the following steps after step S22:

Step S221: Model optimization: Set the loss function of the neural network model CNN, and train the parameters of the neural network model CNN using the neural network training dataset until the loss function converges.

It should be noted that the parameters trained in step S221 are those of the internal neural network model CNN.

The embodiment can further include the following steps after step S221:

Step S222: Model validation: Validate the generalization performance of the neural network model CNN using the validation dataset, obtaining a generalized neural network model CNN.

Here, generalization refers to the neural network's ability to apply to unknown diffraction intensity-complex amplitude relationships.

The embodiment can further include the following steps in step S02, after step S22, to obtain amplitude information and phase information:

Step S23: Model application: Input a new diffraction intensity image into the trained and validated neural network model CNN and output amplitude images and phase images.

The diffraction intensity image can be any new image.

As can be seen, the above embodiment can achieve inputting a single diffraction intensity image into the trained deep neural network model CNN and directly obtain corresponding amplitude and phase information, enabling direct reading of amplitude information and phase information in the complex amplitude image.

In the U-net neural network model shown in FIG. 5, the numbers below each layer, such as 384*384, 192*192, etc., represent the pixel dimensions of the neural network layer image.

The numbers above each layer, such as 64,128, etc., represent the number of output image channels after convolution (corresponding to the number of convolution kernels in the previous step).

3*3 convolution ReLU means: the convolution kernel size is 3*3, and after convoluting the input, it is output to the ReLU activation function for activation.

1*1 convolution Sigmoid means: the convolution kernel size is 1*1, and after convoluting the input, it is output to the Sigmoid activation function for activation.

Both Sigmoid and ReLU are types of activation functions in neural networks, and their function is to increase the non-linear factors in neural networks and address the shortcomings of insufficient expressive ability of linear models. The activation function ultimately determines the content to be transmitted to the next neuron.

Max pooling 2*2 means: for a 2*2 input, each output element is the maximum element value among them. After 2*2 max pooling, the feature map's height and width are halved, and the number of channels remains unchanged.

Upsampling 2*2 means: enlarging the feature map, doubling the height and width of the feature map, and keeping the number of channels unchanged.

Figure 5:
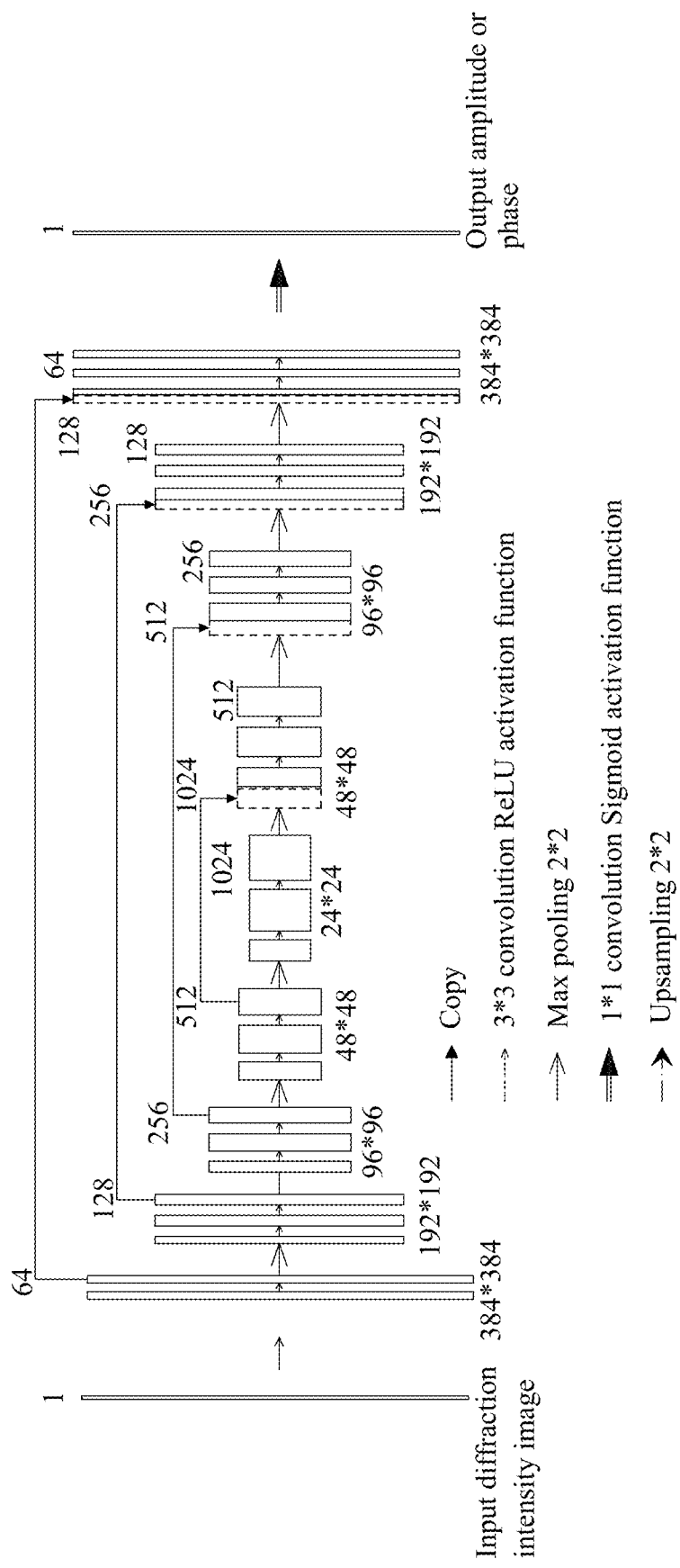
FIG. 5 is a schematic diagram of the U-net neural network model in a non-interferometric, non-iterative complex amplitude reading method in an embodiment of the present invention.

In the embodiment, in step S22, the neural network model can be built upon existing neural network models, such as the U-net neural network model shown in FIG. 5, and the intensity-amplitude model CNN1 and intensity-phase model CNN2 have the same model structure.

Figure 6:
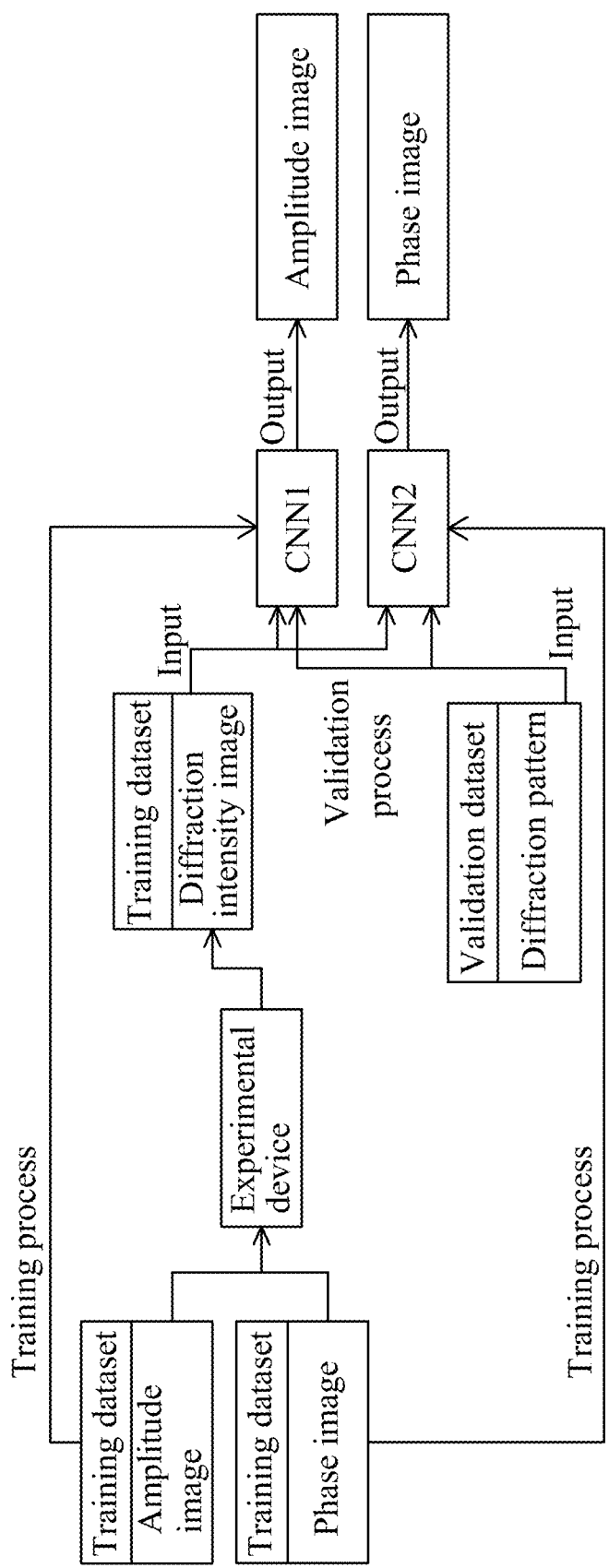
FIG. 6 is a schematic diagram of the training and validation process of the amplitude neural network model and phase neural network model in a non-interferometric, non-iterative complex amplitude reading method in an embodiment of the present invention.

At this point, the model optimization process of the U-net neural network model is shown in FIG. 6, that is, FIG. 6 illustrates the training and validation process of the intensity-amplitude model CNN1 and intensity-phase model CNN2 of the U-net neural network model.

Figure 7:
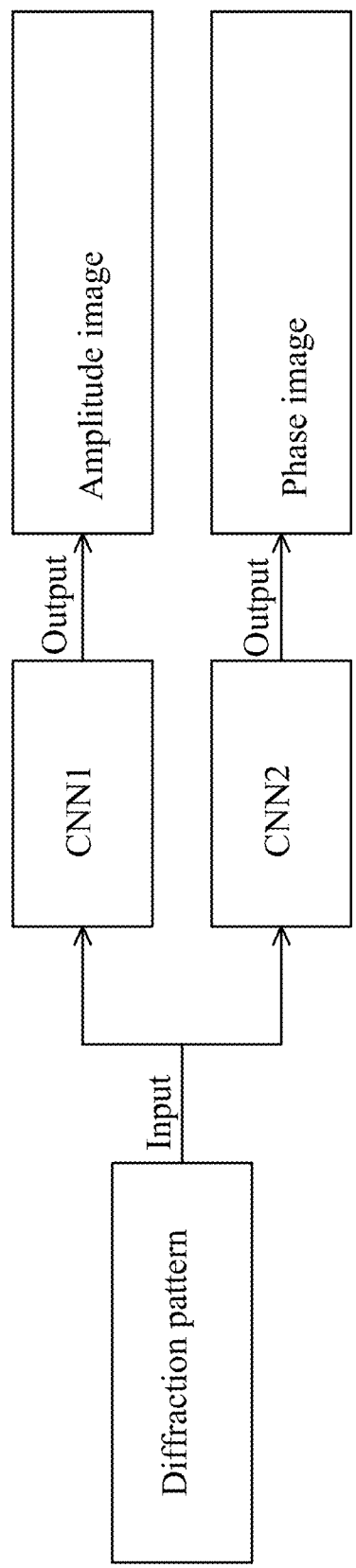
FIG. 7 is a schematic diagram of the direct reading process of amplitude images and phase images in a non-interferometric, non-iterative complex amplitude reading method in an embodiment of the present invention.

At this point, the model application process of the U-net neural network model is shown in FIG. 7, that is, FIG. 7 illustrates the direct reading process of the amplitude image and phase image of the U-net neural network model.

Alternatively, the neural network model CNN can adopt an unsupervised neural network model structure combined with a physical optics diffraction model.

Alternatively, in step S22, the neural network model CNN can adopt a data-driven end-to-end neural network model structure.

Since the U-net neural network model is a type of data-driven end-to-end neural network model structure, the neural network model CNN can adopt other data-driven end-to-end neural network model structures.

Alternatively, in step S22, the neural network model CNN includes an intensity-amplitude neural network model CNN1 and an intensity-phase neural network model CNN2, used for recovering the amplitude image and phase image of the complex amplitude image, respectively.

Alternatively, the network structures of the intensity-amplitude neural network model CNN1 and the intensity-phase neural network model CNN2 can be the same or different.

Alternatively, in step S221, the hyperparameters of the intensity-amplitude neural network model CNN1 and the intensity-phase neural network model CNN2 can be set to be the same or different.

In the single-input, dual-output neural network model shown in FIG. 8, the numbers below each layer, such as 384*384, 192*192, etc., represent the pixel dimensions of the neural network layer image.

The numbers above each layer, such as 64, 128, etc., represent the number of output image channels after convolution (corresponding to the number of convolution kernels in the previous step).

3*3 convolution ReLU means: the convolution kernel size is 3*3, and after convoluting the input, it is output to the ReLU activation function for activation.

1*1 convolution Sigmoid means: the convolution kernel size is 1*1, and after convoluting the input, it is output to the Sigmoid activation function for activation.

Both Sigmoid and ReLU are types of activation functions in neural networks, and their function is to increase the non-linear factors in neural networks and address the shortcomings of insufficient expressive ability of linear models. The activation function ultimately determines the content to be transmitted to the next neuron.

Max pooling 2*2 means: for a 2*2 input, each output element is the maximum element value among them. After 2*2 max pooling, the feature map's height and width are halved, and the number of channels remains unchanged.

Upsampling 2*2 means: enlarging the feature map, doubling the height and width of the feature map, and keeping the number of channels unchanged.

Figure 8:
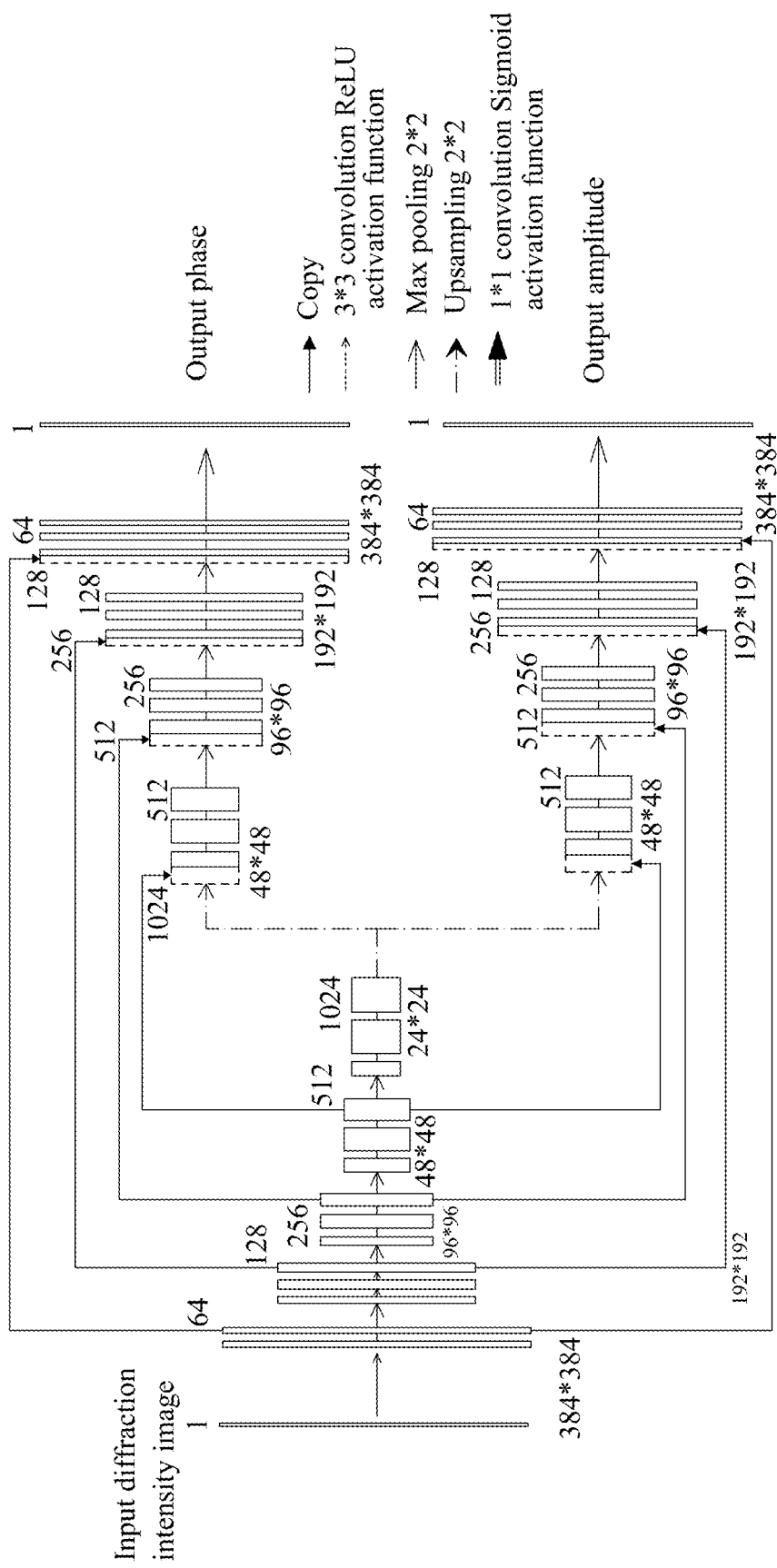
FIG. 8 is a schematic diagram of the single-input, dual-output neural network model in a non-interferometric, non-iterative complex amplitude reading method in an embodiment of the present invention.

Alternatively, in step S22, the neural network model CNN can be set as the diffraction intensity image single-input, amplitude image, and phase image dual-output intensity-amplitude-phase neural network model CNN_12, as shown in FIG. 8.

Figure 9:
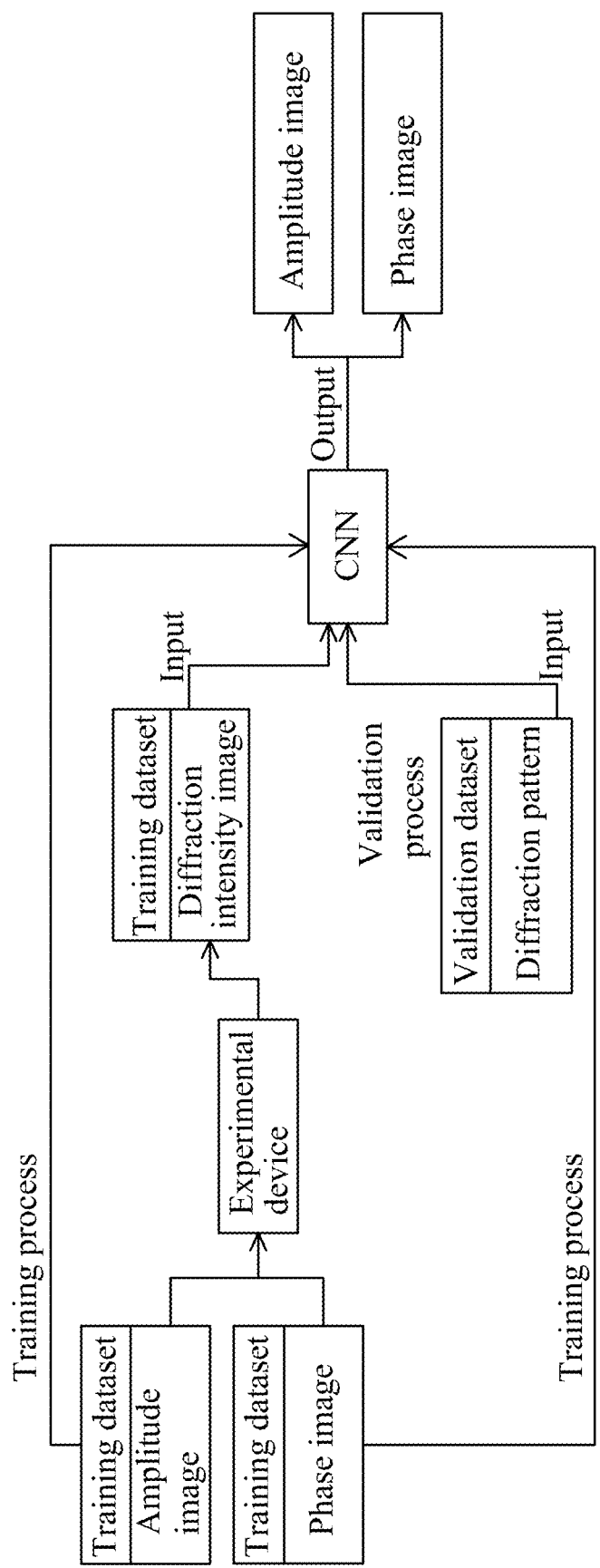
FIG. 9 is a schematic diagram of the training and validation process of the amplitude neural network model and phase neural network model in a non-interferometric, non-iterative complex amplitude reading method in another embodiment of the present invention.

At this point, the model optimization process of the single-input, dual-output intensity-amplitude-phase neural network model CNN_12 for diffraction intensity image, amplitude image, and phase image is shown in FIG. 9, that is, FIG. 9 illustrates the training and validation process of the single-input, dual-output intensity-amplitude-phase neural network model CNN_12.

Figure 10:
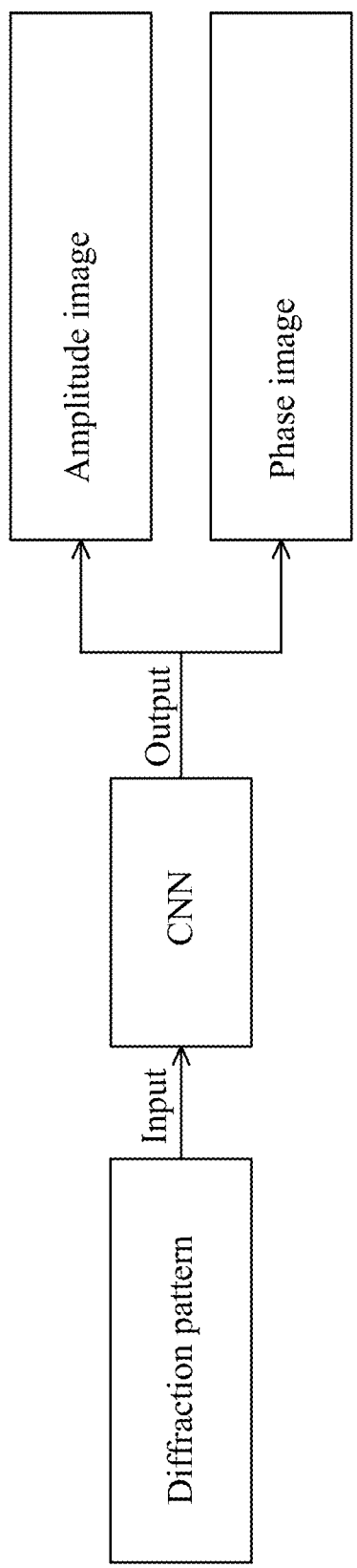
FIG. 10 is a schematic diagram of the direct reading process of amplitude images and phase images in a non-interferometric, non-iterative complex amplitude reading method in another embodiment of the present invention.

At this point, the model application process of the single-input, dual-output intensity-amplitude-phase neural network model CNN_12 is shown in FIG. 10, that is, FIG. 10 illustrates the direct reading process of the amplitude image and phase image of the single-input, dual-output intensity-amplitude-phase neural network model CNN_12.

Embodiment 2

FIG. 4 shows that both the phase image and amplitude image are four-level grayscale random encoding images, and the output of the optical system is the diffraction intensity image.

In FIG. 4, 384*384 represents the pixel size of the image.

[0, 0.1, 0.4, 0.7, 1] represents the size of the amplitude after normalization, where 0 represents an amplitude of 0, i.e., no light; 0.1, 0.4, 0.7, 1 represent four-level grayscale amplitude encoding sizes.

[π/6, 2π/3, n, 3π/2] represent four-level grayscale phase encoding values. 10*10 represents pixels/data points, i.e., each data point is represented by a 10*10 pixel.

The non-interferometric, non-iterative complex amplitude reading method, as shown in FIG. 4, has both phase and amplitude images as four-level grayscale random encoding images, and the system outputs a single diffraction intensity image. Two neural network models, CNN1 and CNN2, are used to establish intensity-amplitude neural network models and intensity-phase neural network models, respectively. The intensity-amplitude dataset and intensity-phase dataset are used to train the two neural network models separately.

For a new diffraction intensity image, input it into the trained intensity-amplitude neural network model CNN1 and intensity-phase neural network model CNN2 to obtain the corresponding amplitude and phase information, realizing complex amplitude reading. The specific steps are as follows:

Step S11, experimental image generation: As shown in FIG. 4, generate 10,000 random encoded four-level grayscale amplitude images (a) and phase images (b).

Step S12, experimental image capture: Load the 10,000 amplitude images (a) and phase images (b) onto a spatial light modulator to modulate the laser beam in amplitude and phase, and use a photodetector 19 to capture the corresponding 10,000 diffraction intensity images (c); each diffraction intensity image (c) and its corresponding amplitude image (a) constitute an intensity-amplitude image pair, and each diffraction intensity image (c) and its corresponding phase image (b) constitute an intensity-phase image pair.

Step S21, dataset preparation: Use the 10,000 diffraction intensity images (c) and the corresponding 10,000 amplitude images (a) as the amplitude training dataset $D_{IA}$; randomly select 9,000 intensity-amplitude images as the amplitude training dataset $T_{IA}$ and the remaining 1,000 intensity-amplitude images as the amplitude validation dataset $V_{IA}$; use $T_{IA}$ to train the amplitude neural network model CNN1, and use $V_{IA}$ to validate the generalization capability of the amplitude neural network model CNN1; use the 10,000 diffraction intensity images (c) and the corresponding 10,000 phase images (b) as the phase training dataset $D_{IP}$. Randomly select 9,000 intensity-phase images as the phase training dataset $T_{IP}$ and the remaining 1,000 intensity-phase images as the phase validation dataset $V_{IP}$; use $T_{IP}$ to train the phase neural network model CNN2, and use $V_{IP}$ to validate the generalization capability of the phase neural network model CNN2.

Step S22, model building: Select the U-net neural network model shown in FIG. 5 as the network model. The hyperparameters of the intensity-amplitude neural network model CNN1 and intensity-phase neural network model CNN2 are the same;

Step S221, model optimization: Set the hyperparameters of the intensity-amplitude neural network model CNN1 and intensity-phase neural network model CNN2 according to Table 1.

TABLE 1

| Hyperparameter settings for neural network models CNN1 and CNN2 | |
|---|---|
| Loss function | MSE |
| Training epochs | 50 |
| Learning rate | $10^{-4}$ |
| Batch size | 4 |
| Optimizer | Adam |

Mean Squared Error (MSE) is selected as the loss function for the intensity-amplitude neural network model CNN1 and the intensity-phase neural network model CNN2:

$$MSE = \min \frac{1}{JWH} \sum_{j=1}^{J} \sum_{u=1}^{W} \sum_{v=1}^{H} \left( \tilde{C}_j(u, v) - C_j(u, v) \right)$$

where W is the width of the input image, H is the height of the input image. J is the training batch size, which refers to the batch size (batchsize) in deep learning training. The training batch size will determine the number of samples in a single training session. For example, if the total number of training data is 9,000 training images, as mentioned above, the training batch size can be 4, meaning that 4 samples are taken from the 9,000 training images for each training session. The samples for the training batch can be randomly selected, for example, randomly selecting 4 samples from the 9,000 training images for each training session.

$\tilde{C}_j(u, v)$ is the predicted output of the neural network model, and $C_j(u, v)$ is the corresponding true value. Train the amplitude neural network model CNN1 and the phase neural network model CNN2 using the amplitude training dataset $T_{IA}$ and the phase training dataset $T_{IP}$, respectively, until the loss function MSE converges. Validate the generalization capability of the amplitude neural network model CNN1 and the phase neural network model CNN2 using the amplitude validation dataset $V_{IA}$ and the phase validation dataset $V_{IP}$, respectively. Under the conditions of the amplitude neural network model CNN1 and the phase neural network model CNN2 and hyperparameter settings, the training process of the amplitude neural network model CNN1 and the phase neural network model CNN2 is shown in FIG. 6.

Step S23, model application: Input any new diffraction intensity image I into the trained amplitude neural network model CNN1 and phase neural network model CNN2, directly output the amplitude image and phase image, and achieve direct complex amplitude reading. The complex amplitude reading process is shown in FIG. 7.

Embodiment 3

Non-interferometric, non-iterative complex amplitude reading method, where the phase image and amplitude image are both four-level grayscale random coded images, and the system output is a single diffraction intensity image. A neural network model CNN is used to establish the intensity-amplitude-phase neural network model. Train the single-input dual-output neural network model using the intensity-amplitude-phase dataset. For a new diffraction intensity image, input it into the trained intensity-amplitude-phase neural network model CNN to obtain the corresponding amplitude and phase information, realizing complex amplitude reading. The specific steps are as follows:

Step S11, experimental image generation: As shown in FIG. 4, generate 10,000 randomly coded four-level grayscale amplitude images (a) and four-level grayscale phase images (b).

Step S12, experimental image capture: Load the 10,000 amplitude images (a) and phase images (b) onto a spatial light modulator to modulate the amplitude and phase of the light beam, and use the photoelectric detector 19 to capture the corresponding 10,000 diffraction intensity images (c); each diffraction intensity image (c) and its corresponding amplitude image (a) form an intensity-amplitude image pair, and each diffraction intensity image (c) and its corresponding phase image (b) form an intensity-phase image pair.

Step S21, dataset preparation: Combine the 10,000 intensity images (c) with the corresponding 10,000 amplitude images (a) and 10,000 phase images (b) to form 10,000 intensity-amplitude-phase images, randomly select 9,000 sets of intensity-amplitude-phase images as amplitude and phase training data $T_{IC}$, and the remaining 1,000 sets of intensity-amplitude-phase images as amplitude and phase validation dataset; train the single-input dual-output neural network model CNN using $T_{IC}$, and validate the generalization capability of the single-input dual-output neural network model CNN using Vic.

Step S22, model building: Choose the intensity-amplitude-phase neural network model CNN_12 with a single-input diffraction intensity image and dual-output amplitude image and phase image, as shown in FIG. 8, as the single-input dual-output neural network model CNN.

Step S221, model optimization: Set the hyperparameters for the single-input dual-output neural network model CNN according to Table 2.

TABLE 2

Neural network model CNN hyperparameter settings

| Loss function | MSE |
|---|---|
| Training epochs | 50 |
| Learning rate | $10^{-4}$ |
| Batch size | 4 |
| Optimizer | Adam |

Select Mean Squared Error (MSE) as the loss function for the single-input dual-output neural network model CNN:

$$MSE = MSE_A + \lambda MSE_P$$

$$MSE_A = \min \frac{1}{JWH} \sum_{j=1}^{J} \sum_{u=1}^{W} \sum_{v=1}^{H} \left( \tilde{A}_j(u, v) - A_j(u, v) \right)$$

where W is the width of the input image, H is the height of the input image, and J is the training batch size; $\tilde{A}_j(u, v)$ is the predicted output of the neural network, and $A_j(u, v)$ is the true value; train the single-input dual-output neural network model CNN using the intensity-amplitude-phase training dataset until the loss function MSE converges, and validate the generalization capability of the single-input dual-output neural network model CNN using the intensity-amplitude-phase validation dataset; under this model and hyperparameter settings, the model training process is shown in FIG. 9. In this case, the loss function is a combination of amplitude and phase, so the true value is neither purely phase nor purely amplitude, but rather amplitude+λ×phase.

Step S23, model application: Input any new diffraction intensity image I into the trained amplitude neural network model CNN, directly output amplitude image and phase image, realizing direct complex amplitude reading. The complex amplitude reading process is shown in FIG. 10.

Embodiment 4

Figure 11:
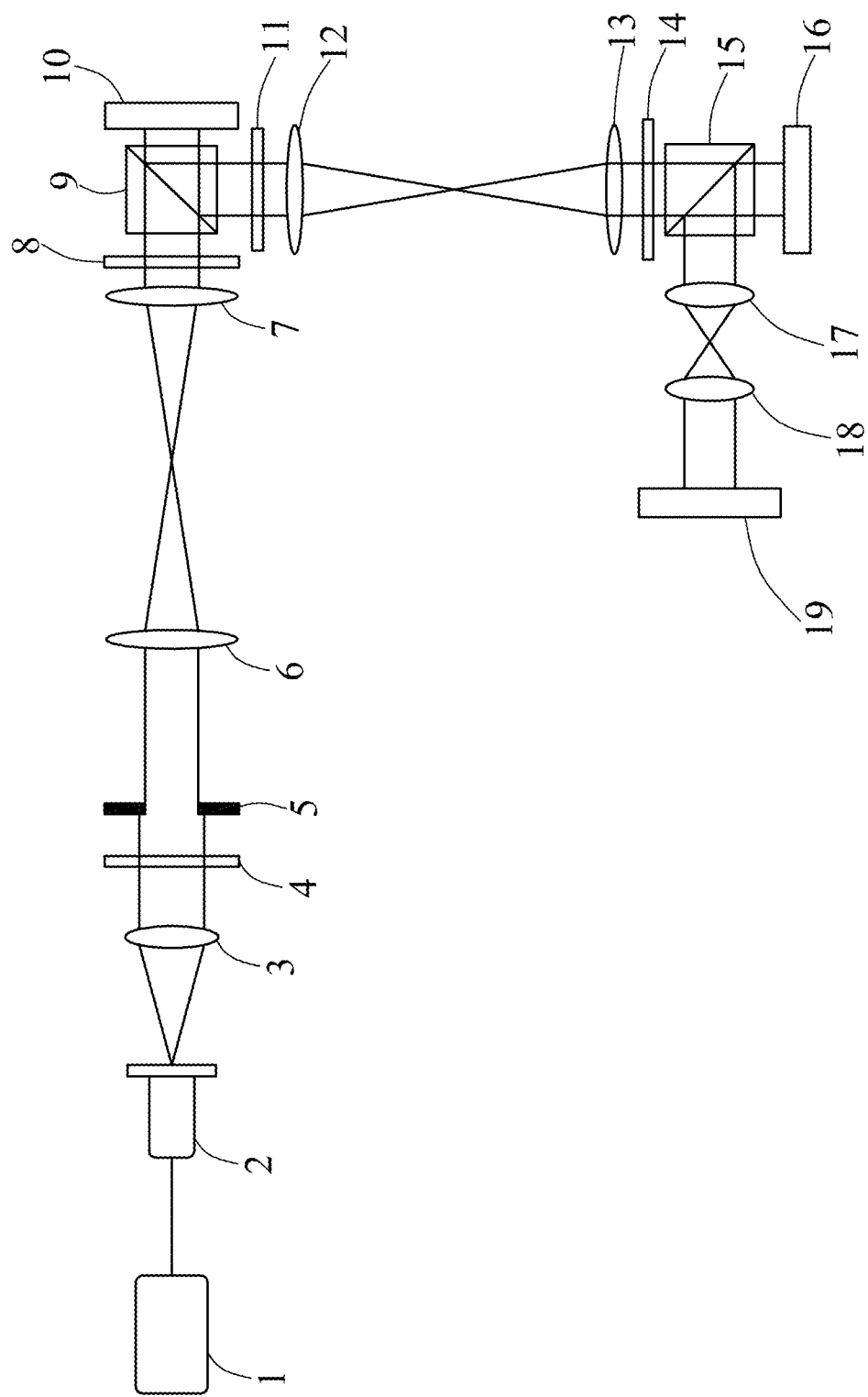
FIG. 11 is a schematic diagram of the optical system structure in a non-interferometric, non-iterative complex amplitude reading apparatus in an embodiment of the present invention.

Please refer to FIG. 11. The embodiment provides a non-interferometric, non-iterative complex amplitude reading apparatus for implementing the non-interferometric, non-iterative complex amplitude reading methods disclosed in any of Embodiments 1 to 3.

The non-interferometric, non-iterative complex amplitude reading apparatus includes an optical system and an electronic device. The optical system comprises, sequentially arranged along the incident light beam propagation direction, a laser 1, a beam collimating component, a first ½ wave plate 4, an aperture 5, a first imaging component, a first polarizer 8, and a transmission-reflection type first beam splitter 9. An amplitude spatial light modulator 10 is arranged in the transmission light beam propagation direction of the first beam splitter 9, and a second polarizer 11, a second imaging component, a second ½ wave plate 14, and a transmission-reflection type second beam splitter 15 are sequentially arranged in the reflection light beam propagation direction of the first beam splitter 9. A phase spatial light modulator 16 is arranged in the transmission light beam propagation direction of the second beam splitter 15, and a third imaging component and a photoelectric detector 19 are sequentially arranged in the reflection light beam propagation direction of the second beam splitter 15. The electronic device includes one or more processors and memory, and the memory stores one or more computer programs. When one or more processors receive the diffraction pattern captured by the photoelectric detector 19 and execute one or more computer programs, the non-interferometric, non-iterative complex amplitude reading method steps of any one of Embodiments 1 to 3 are implemented.

In the above-described non-interferometric, non-iterative complex amplitude reading apparatus, the electronic device can be a computer. The computer generates amplitude and phase images of the complex amplitude, and the corresponding experimental diffraction intensity images are obtained by capturing them through the optical system, completing the non-interferometric complex amplitude reading method step S01. Then, the computer completes the non-interferometric, non-iterative complex amplitude reading method step S02.

In practical applications, during the neural network model application stage after completing neural network model training and validation, the optical system is still used to capture diffraction intensity images, which are then input into the neural network model for complex amplitude reconstruction. That is, both the computer and the optical system are needed.

Specifically, the beam collimating component includes a pinhole filter 2 and a collimating lens 3, arranged sequentially along the incident light beam propagation direction. The aperture 5 is used to control the diameter of the light beam. The first imaging component includes a first relay lens 6 and a second relay lens 7, arranged sequentially along the light beam propagation direction. The first relay lens 6 and the second relay lens 7 form a 4f system. The first polarizer 8 is a horizontal polarizing plate. The first beam splitter 9 is a polarizing beam splitter and a non-polarizing cube beam splitter. The second polarizer 11 is a vertical polarizing plate. The second imaging component includes a third relay lens 12 and a fourth relay lens 13, arranged sequentially along the light beam propagation direction. The third relay lens 12 and the fourth relay lens 13 form a 4f system. The second beam splitter 15 is a non-polarizing cube beam splitter. The third imaging component includes a fifth relay lens 17 and a sixth relay lens 18, arranged sequentially along the light beam propagation direction. The fifth relay lens 17 and the sixth relay lens 18 form a 4f system.

In the above-described non-interferometric, non-iterative complex amplitude reading apparatus, the specific working process can be as follows:

Laser 1 emits a laser, for example, a green laser with a wavelength of 532 nm. After passing through the pinhole filter 2 and collimating lens 3, the laser is converted into a parallel light beam of good quality. After passing through the first ½ wave plate 4 and aperture 5, the cross-section of the parallel light beam changes from a circular shape to the aperture hole shape of aperture 5. The first relay lens 6 and the second relay lens 7 form a 4f system that images the aperture 5 onto the plane where the spatial light modulator 10 is located. The laser beam passes through the first polarizer 8 and the first beam splitter 9, and after incident on the spatial light modulator 10, its reflected light passes through the first beam splitter 9 again and is reflected in a direction perpendicular to the original optical path. The spatial light modulator 10 can be an amplitude-type spatial light modulator, or it can be a phase-type spatial light modulator combined with the first polarizer 8 and the second polarizer 11, which are perpendicular in polarization direction, to achieve amplitude modulation of the laser beam. That is, the role of the spatial light modulator 10 is to upload a specific amplitude image so that when the laser beam is incident on the spatial light modulator 10 and is reflected and passes through the second polarizer 11, it carries accurate amplitude information. The laser beam with amplitude information then passes through the third relay lens 12 and the fourth relay lens 13, which also form a 4f system, to image the amplitude spatial light modulator 10 onto the plane where the second spatial light modulator 16 is located. After passing through the 4f system composed of the third relay lens 12 and the fourth relay lens 13, the laser beam continues to pass through the second ½ wave plate 14 and the second beam splitter 15 and is incident on the second beam splitter 15. The function of the second ½ wave plate 14 is to adjust the polarization state of the laser beam to meet the polarization state requirements of the phase-type spatial light modulator 16. The role of the phase spatial light modulator 16 is to upload a specific phase image P to achieve phase modulation of the laser beam. The laser beam carrying amplitude and phase information reflected from the phase-type spatial light modulator 16 is reflected in a direction perpendicular to the original optical path after passing through the second beam splitter 15 and then incident on the photoelectric detector 19 through the fifth relay lens 17 and the sixth relay lens 18. The fifth relay lens 17 and the sixth relay lens 18 form a 4f system, which precisely images the plane where the second beam splitter 15 is located onto the back focal plane of the sixth relay lens 18. Along the laser beam propagation direction, the photoelectric detector 19 is located on a plane behind the back focal plane of the sixth relay lens 18. Therefore, the light beam at the back focal plane of the sixth relay lens 18 has accurate amplitude and phase information. The laser beam continues to propagate a preset distance, and the diffracted light enters the photoelectric detector 19, which receives the diffraction pattern with light intensity changes, that is, the diffraction intensity image I, also shown as the diffraction intensity image (c) in FIGS. 4 and 5.

The non-interferometric, non-iterative complex amplitude reading method and apparatus of the present embodiment, through building a non-interferometric lensless complex amplitude diffraction reconstruction optical system, using electronic devices such as computers to generate amplitude and phase images, uploading amplitude and phase images onto the optical system to obtain diffraction intensity images to establish a neural network dataset, constructing the neural network model structure and setting corresponding parameters, using the dataset to train and validate the generalization of the neural network model, and inputting arbitrary diffraction images into the neural network model to directly output amplitude and phase images, can further improve the speed and accuracy of amplitude and phase reading, as well as simplify the apparatus.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A non-interferometric, non-iterative complex amplitude reading method, comprising a plurality of steps:
   step S01: diffracting a light beam containing amplitude information and phase information to obtain a diffraction pattern with intensity variations;
   step S02: constructing a diffraction intensity-complex amplitude model and training it based on the relationship between the diffraction pattern and the amplitude information and the phase information, and directly obtaining amplitude information and phase information for new diffraction patterns by applying the diffraction intensity-complex amplitude model.

2. The non-interferometric, non-iterative complex amplitude reading method according to claim 1, characterized in that, in the step S02, a plurality of neural network model parameters for the diffraction intensity-complex amplitude model are established by training the corresponding relationships between multiple inputs and multiple outputs.

3. The non-interferometric, non-iterative complex amplitude reading method according to claim 1, characterized by a plurality of following steps in step S01:
   step S11 of experimental image generation: generating n amplitude images and phase images with different patterns, where n≥1 and n is a positive integer;
   step S12 of experimental image capture: modulating the amplitude and phase of the light beam using a complex amplitude image datasetontaining the amplitude images and the phase images, and capturing diffraction intensity images corresponding to the amplitude and phase modulation;
   in step S02, a plurality of following steps is included:
   step S21 of dataset preparation: forming dataset by combining the diffraction intensity images with the complex amplitude image dataset, dividing the dataset into mutually exclusive neural network training dataset and validation dataset, used for training and validating the neural network model, respectively;
   step S22 of model construction: establishing the diffraction intensity-complex amplitude model consistent with the neural network model.

4. The non-interferometric, non-iterative complex amplitude reading method according to claim 3, characterized in that, after the step S22, a following step is included:
   step S221 of model optimization: setting the loss function of the neural network model, training the parameters of the neural network model using the neural network training dataset until the loss function converges.

5. The non-interferometric, non-iterative complex amplitude reading method according to claim 4, characterized in that, after step S221, a following step is included:
   step S222 of model validation: validating the generalization performance of the neural network model using the validation dataset, obtaining the generalized neural network model.

6. The non-interferometric, non-iterative complex amplitude reading method according to claim 3, characterized in that, after the step S22 in the step S02, obtaining the amplitude information and the phase information includes a following step:
   step S23 of model application: inputting a new diffraction intensity image into the trained and validated neural network model, outputting the amplitude image and the phase image.

7. The non-interferometric, non-iterative complex amplitude reading method according to claim 3, characterized in that, in step S11, the amplitude images and the phase images are randomly encoded amplitude images (a) and phase images (b), or the amplitude images and the phase images are natural visual images.

8. The non-interferometric, non-iterative complex amplitude reading method according to claim 3, characterized in that, in step S22, the neural network model adopts an unsupervised neural network model structure combined with a physical optics diffraction model, or the neural network model adopts a data-driven end-to-end neural network model structure, or the neural network model includes an intensity-amplitude neural network model and an intensity-phase neural network model, used to recover the amplitude image and the phase image of the complex amplitude image, or the neural network model is set as a single-input diffraction intensity image, double-output amplitude image and phase image intensity-amplitude-phase neural network model.

9. A non-interferometric, non-iterative complex amplitude reading apparatus for implementing a non-interferometric, non-iterative complex amplitude reading method, the reading apparatus includes an optical system and electronic devices;
   wherein the optical system includes a laser, a beam collimator, a first ½ wave plate, an aperture, a first imaging component, a first polarizer, and a transmission-reflection type first beam splitter arranged in sequence along a propagation direction of an incident light beam; an amplitude spatial light modulator is arranged in a propagation direction of a transmission light beam of the first beam splitter, and a second polarizer, a second imaging component, a second ½ wave plate, and a transmission-reflection type second beam splitter are sequentially arranged in a reflection light beam propagation direction of the first beam splitter; a phase spatial light modulator is arranged in a transmission light beam propagation direction of the second beam splitter, and a third imaging component and a photodetector are sequentially arranged in a reflection light beam propagation direction of the second beam splitter;
   wherein the electronic devices include one or more processors and memory devices, the memory devices store one or more computer programs, which, when executed by the one or more processors receiving a diffraction pattern captured by the photodetector, implement a plurality of steps:
   step S01: diffracting a light beam containing amplitude information and phase information to obtain a diffraction pattern with intensity variations;
   step S02: constructing a diffraction intensity-complex amplitude model and training it based on the relationship between the diffraction pattern and the amplitude information and the phase information, and directly obtaining amplitude information and phase information for new diffraction patterns by applying the diffraction intensity-complex amplitude model.

10. The non-interferometric, non-iterative complex amplitude reading apparatus according to claim 9, characterized in that, in the step S02, a plurality of neural network model parameters for the diffraction intensity-complex amplitude model are established by training the corresponding relationships between multiple inputs and multiple outputs.

11. The non-interferometric, non-iterative complex amplitude reading apparatus according to claim 9, characterized by a plurality of following steps in step S01:
step S11 of experimental image generation: generating n amplitude images and phase images with different patterns, where n≥1 and n is a positive integer;
step S12 of experimental image capture: modulating the amplitude and phase of the light beam using a complex amplitude image datasetontaining the amplitude images and the phase images, and capturing diffraction intensity images corresponding to the amplitude and phase modulation;
in step S02, a plurality of following steps is included:
step S21 of dataset preparation: forming dataset by combining the diffraction intensity images with the complex amplitude image dataset, dividing the dataset into disjoint neural network training dataset and validation dataset, used for training and validating the neural network model, respectively;
step S22 of model construction: establishing the diffraction intensity-complex amplitude model consistent with the neural network model.

12. The non-interferometric, non-iterative complex amplitude reading apparatus according to claim 11, characterized in that, after the step S22, a following step is included:
step S221 of model optimization: setting the loss function of the neural network model, training the parameters of the neural network model using the neural network training dataset until the loss function converges.

13. The non-interferometric, non-iterative complex amplitude reading apparatus according to claim 12, characterized in that, after step S221, a following step is included:
step S222 of model validation: validating the generalization performance of the neural network model using the validation dataset, obtaining the generalized neural network model.

14. The non-interferometric, non-iterative complex amplitude reading apparatus according to claim 11, characterized in that, after the step S22 in the step S02, obtaining the amplitude information and the phase information includes a following step:
step S23 of model application: inputting a new diffraction intensity image into the trained and validated neural network model, outputting the amplitude image and the phase image.

15. The non-interferometric, non-iterative complex amplitude reading apparatus according to claim 11, characterized in that, in step S11, the amplitude images and the phase images are randomly encoded amplitude images (a) and phase images (b), or the amplitude images and the phase images are natural visual images.

16. The non-interferometric, non-iterative complex amplitude reading apparatus according to claim 11, characterized in that, in step S22, the neural network model adopts an unsupervised neural network model structure combined with a physical optics diffraction model, or the neural network model adopts a data-driven end-to-end neural network model structure, or the neural network model includes an intensity-amplitude neural network model and an intensity-phase neural network model, used to recover the amplitude image and the phase image of the complex amplitude image, or the neural network model is set as a single-input diffraction intensity image, double-output amplitude image and phase image intensity-amplitude-phase neural network model.

17. The non-interferometric, non-iterative complex amplitude reading apparatus according to claim 9, characterized in that the beam collimator includes a pinhole filter and a collimating lens arranged in sequence along the incident light beam propagation direction.

\* \* \* \* \*